United States Patent
Barth et al.

(10) Patent No.: US 7,181,559 B2
(45) Date of Patent: Feb. 20, 2007

(54) MESSAGE BASED TRANSPORT MECHANISM FOR LEVEL SENSITIVE INTERRUPTS

(75) Inventors: Frank Barth, Radebeul (DE); Jörg Winkler, Ullersdorf (DE); Thomas Kunjan, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 179 days.

(21) Appl. No.: 10/970,239

(22) Filed: Oct. 21, 2004

(65) Prior Publication Data

US 2005/0144346 A1 Jun. 30, 2005

(30) Foreign Application Priority Data

Dec. 29, 2003 (DE) ............... 103 61 364

(51) Int. Cl.
*G06F 13/24* (2006.01)
(52) U.S. Cl. ...................... 710/263; 710/260
(58) Field of Classification Search ......... 710/260–263
See application file for complete search history.

(56) References Cited

U.S. PATENT DOCUMENTS

| | | | |
|---|---|---|---|
| 4,768,149 A | | 8/1988 | Konopik et al. |
| 5,261,107 A | * | 11/1993 | Klim et al. ............. 710/266 |
| 5,664,205 A | | 9/1997 | O'Brien et al. |
| 5,771,387 A | | 6/1998 | Young |
| 5,951,669 A | * | 9/1999 | Bailey et al. ............ 710/260 |
| 6,000,040 A | * | 12/1999 | Culley et al. ............ 714/31 |
| 6,145,047 A | * | 11/2000 | Garinger et al. ......... 710/261 |
| 6,298,410 B1 | * | 10/2001 | Jayakumar et al. ...... 710/266 |
| 6,681,261 B2 | * | 1/2004 | Mancusi et al. ......... 709/250 |
| 6,915,394 B1 | * | 7/2005 | Sandorfi ................. 711/154 |
| 2006/0123275 A1 | * | 6/2006 | Reynolds ................ 714/700 |

FOREIGN PATENT DOCUMENTS

DE 19580707 6/1995

OTHER PUBLICATIONS

Eng RC, Galella JW, Stelzer EH, "Interrupt translation circuitry", IBM Tech. Disc. Bull. 33:5, Oct. 1980, pp. 219-220, 2pp.*
Translation of Official Communication in German application No. 103 61 364.1-53 mailed Aug. 24, 2004.
Adam, "Den Glaschenhals umgehen, Interruptverhalten und Echtzeit bei CompactPCI", *ElektronikPraxis*, Nr. 3-12, Feb. 1999, Germany.
Translation of Office Action application No. DE10361364.1-53 mailed Jul. 18, 2006.

* cited by examiner

*Primary Examiner*—Rehana Perveen
*Assistant Examiner*—Clifford Knoll
(74) *Attorney, Agent, or Firm*—Meyertons Hood Kivlin Kowert & Goetzel, P.C.; B. Noël Kivlin

(57) ABSTRACT

An interrupt handling technique is provided that may allow for sharing level sensitive interrupts in systems where interrupts are message based, i.e., edge triggered. An interrupt input unit is provided for receiving level sensitive interrupt requests and generating request occurrence signals therefrom. An edge detection unit generates start signals for edge triggered interrupt messages on the basis of the request occurrence signals. An interrupt termination detection unit receives termination signals each indicating that an interrupt routine relating to a previous edge triggered interrupt message has terminated. The interrupt input unit is controlled to output a request occurrence signal in response to a received termination signal if a previously received level sensitive interrupt request is still active. That is, a second edge triggered interrupt message may be generated.

48 Claims, 3 Drawing Sheets

MESSAGE BASED TRANSPORT MECHANISM FOR LEVEL SENSITIVE INTERRUPTS

BACKGROUND OF THE INVENTION

1. Field of the Invention

The present invention relates to interrupt handling apparatus and methods, and in particular to interrupt handling mechanisms which may deal with level sensitive interrupt requests and edge triggered interrupt messages.

2. Description of the Related Art

In modern computer systems, two different kinds of interrupts can be distinguished: level sensitive interrupts (or leveled triggered interrupts) and edge triggered interrupts. Generally speaking, level sensitive interrupts can be viewed to define a condition for an interrupt whereas edge triggered interrupts can be viewed as a discrete event.

Standard PCI (Peripheral Component Interconnect) functions and devices use level sensitive interrupts. Level sensitive interrupts can be shared by multiple I/O devices, meaning that multiple I/O devices can share the same interrupt line even though individually the interrupts from each device are discrete events. That is, multiple devices can all assert the line, and when a level sensitive interrupt occurs, the ISR (Interrupt Service Routine) must poll all the devices that are sharing the interrupt line.

Edge triggered interrupts are handled differently from level sensitive interrupts because a single edge triggered interrupt counts as a single occurrence of an event while level sensitive interrupts are conditions that exist. Modern bus concepts use e.g., MSI (Message Signal Interrupt) transport mechanisms to reduce the number of sideband signals. Message signal interrupts are edge triggered.

When servicing level sensitive interrupts in systems where interrupts are message based, i.e., edge triggered, a problem may arise in case multiple I/O devices share the same interrupt line. In particular, situations may exist where shared interrupts would cause only one interrupt message even if more than one interrupt source is active. Thus, an interrupt may get lost if it occurs during a time period in which a previous interrupt is still in service.

SUMMARY OF THE INVENTION

An interrupt handling technique is provided that may allow for sharing level sensitive interrupts while using edge triggered interrupt transport mechanisms such as MSI techniques.

In one embodiment, an interrupt handling apparatus is provided that comprises an interrupt input unit for receiving level sensitive interrupt requests and generating request occurrence signals therefrom. Each request occurrence signal indicates that a level sensitive interrupt request has been received. The interrupt handling apparatus further comprises an edge detection unit that is connected to the interrupt input unit for receiving the request signals and generating start signals for edge triggered interrupt messages on the basis of the received request occurrence signals. The interrupt handling apparatus further comprises an interrupt termination detection unit for receiving termination signals that each indicate that an interrupt routine has terminated that relates to a previous edge triggered interrupt message. The interrupt termination detection unit is arranged for controlling the interrupt input unit to output a request occurrence signal in response to a received termination signal if a previously received level sensitive interrupt request is still active.

According to another embodiment, there is provided an interrupt handling method that comprises receiving level sensitive interrupt requests, receiving termination signals that each indicate that an interrupt routine relating to a previous edge triggered interrupt message has terminated, generating request occurrence signals based on the level sensitive interrupt requests and the termination signals, and generating start signals for edge triggered interrupt messages on the basis of the request occurrence signals. A request occurrence signal is generated in response to a termination signal if a previously received level sensitive interrupt request is still active.

In a further embodiment, an interrupt handling method is provided that comprises receiving a level sensitive interrupt request, generating a first edge triggered interrupt message on the basis of the received level sensitive interrupt request, determining whether an interrupt routine relating to the first edge triggered interrupt message has terminated, determining whether the received level sensitive interrupt request is still active when an interrupt routine relating to the first edge triggered interrupt message has terminated, and generating a second edge triggered interrupt message if it is determined that the received level sensitive interrupt request is still active.

According to still a further embodiment, an integrated circuit chip is provided that comprises interrupt handling circuitry. The interrupt handling circuitry has an interrupt input circuit for receiving level sensitive interrupt requests and generating request occurrence signals therefrom. The interrupt handling circuitry further has an edge detection circuit that is connected to the interrupt input circuit for receiving the request occurrence signals and generating start signals for edge triggered interrupt messages on the basis of the received request occurrence signals. The interrupt handling circuitry further has an interrupt termination detection circuit for receiving termination signals that each indicate that an interrupt routine has terminated that relates to a previous edge triggered interrupt message. The interrupt termination detection circuit is arranged for controlling the interrupt input circuit to output a request occurrence signal in response to a received termination signal if a previously received level sensitive interrupt request is still active.

According to yet another embodiment, a computer system is provided that comprises a processor coupled to a signaling bus. The signaling bus is adapted to transport edge triggered interrupt messages. The computer system further comprises at least one device that is capable of issuing level sensitive interrupt requests. The computer system further comprises an interrupt message control logic for generating a first edge triggered interrupt message on the basis of a level sensitive interrupt request received from the at least one device, and generating a second edge triggered interrupt message if the received level sensitive interrupt request is still active when an interrupt routine relating to the first edge triggered interrupt message has terminated.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Figure 1:
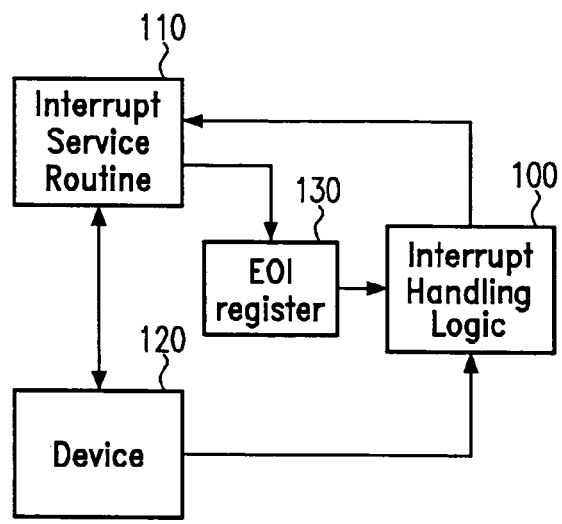
FIG. 1 is a block diagram illustrating a computer system having an interrupt handling mechanism according to an embodiment.

Turning now to the figures and particularly to FIG. 1, a computer system according to an embodiment is shown that embodies the interrupt handling mechanism according to an embodiment. One or more devices 120 are provided that may be PCI or PCI-Express functions or devices. The devices issue level sensitive interrupt requests to the interrupt message control logic (or interrupt handling logic) 100.

It is further provided an interrupt service routine 110 that may be any routine whose purpose is to service the device(s) 120 when it generates an interrupt. Unit 110 may be a processor performing an interrupt servicing function. The interrupt message control logic 100 is connected to the interrupt service routine 110 via a signaling bus.

In the present embodiment, each driver of a physical device 120 that generates interrupts registers an interrupt service routine 110 before it starts the device 120. When a driver registers an interrupt service routine 110, the system creates an interrupt object. The interrupt service routine 110 then quickly services the device interrupt and schedules post-interrupt processing of received data, if necessary. Generally, an interrupt service routine may be any routine that is responsible for servicing hardware (e.g., reading and/or writing some device ports), for updating some data structures shared between the interrupt service routine 110 and the threads running in the application, and for signaling the threads that some kind of event has occurred.

According to FIG. 1, there is further provided an EOI (End Of Interrupt) register 130 that is connected to the interrupt service routine 110 and to the interrupt message control logic 100. Software may write to this register when it is ready to accept another interrupt, i.e., to inform that the servicing of the interrupt is completed and the processor is available to handle the next pending interrupt.

The interrupt message control logic 100 shown in FIG. 1 will be described in more detail below with reference to FIGS. 2 and 3 which depict embodiments of the interrupt message control logic 100.

Figure 2:
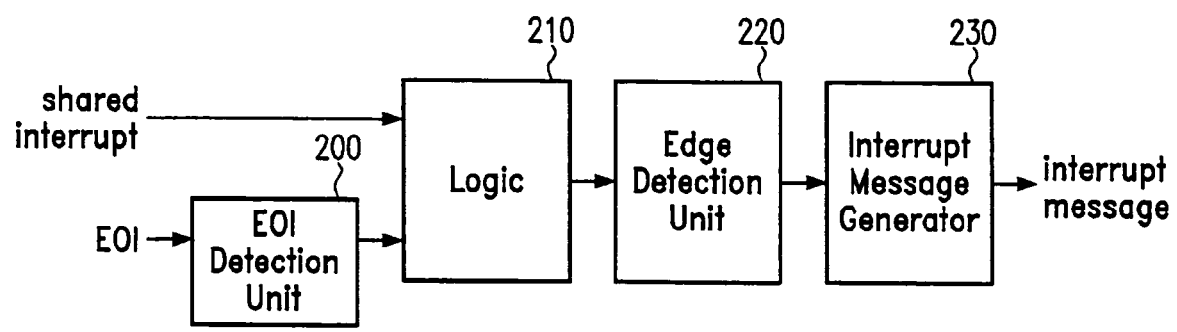
FIG. 2 is a block diagram illustrating components of an interrupt message control logic according to an embodiment.

Turning first to FIG. 2, shared level sensitive interrupts are received at logic 210 and passed to the edge detection unit 220. The edge detection unit 220 generates start signals for edge triggered interrupt messages and sends the start signals to the interrupt message generator 230. The interrupt message generator 230 then generates edge triggered interrupt messages.

In response to servicing a generated interrupt message, the interrupt service routine 110 may generate either an EOI message that is fed to the EOI detection unit 200, or it may directly write into the EOI register 130 which may then cause a short pulse signal to be sent to the EOI detection unit 200. Thus, the EOI detection unit 200 detects either an EOI message or the generated pulse signal.

The EOI event is then submitted to the logic 210 where it is determined whether the interrupt input line is still asserted, i.e., whether a further shared source is still active. If so, the edge detection unit 220 is again controlled to generate a start signal for an edge triggered interrupt message, and the interrupt message generator 230 generates another interrupt message.

Again, if the interrupt service routine 110 generates an EOI message or writes to the EOI register 130 before returning, and if the level sensitive interrupt input line is still asserted, yet another edge triggered interrupt message may be generated. That is, multiple I/O devices and functions may share the same level sensitive interrupt line in systems where interrupts are message based, and there is no theoretical limit for the number of sharing devices.

Figure 3:
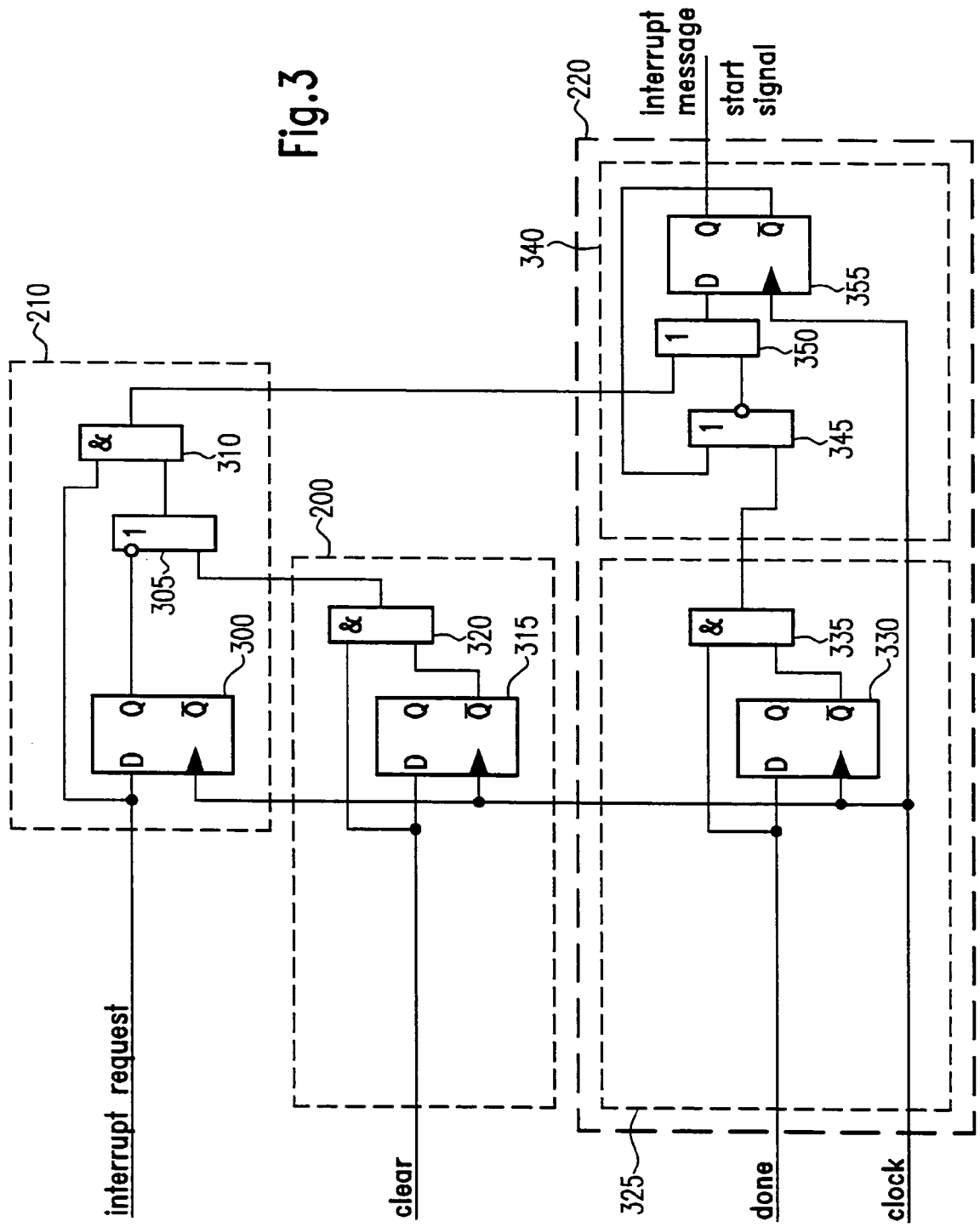
FIG. 3 is a circuit diagram illustrating an interrupt message control logic according to another embodiment.

Turning now to the embodiment of FIG. 3, a circuit diagram of components 200, 210 and 220 is provided.

As may be seen from FIG. 3, an interrupt input unit 210 is provided that corresponds to logic 210. The interrupt input unit 210 receives the level sensitive interrupt requests from the devices 120. The interrupt requests are forwarded to a logic AND gate 310, and to a storage element 300 that may be a D flip-flop device. It is further provided a logic OR gate 305 that is connected to receive an inverted output signal of the D flip-flop device 300. The OR gate 305 further receives a control signal from interrupt termination detection unit 200 that corresponds to the EOI detection unit 200 of FIG. 2. An input terminal of the AND gate 310 is connected to the output terminal of the OR gate 305.

Discussing now in more detail the interrupt termination detection unit 200, elements 315 and 320 may be viewed as rising edge detection unit. The unit receives a "clear" signal that is a termination signal indicating that the interrupt routine relating to a previous edge triggered interrupt message has come to an end. The interrupt termination detection unit 200 generates the control signal that is provided to the OR gate 305 of the interrupt input unit 210.

As can be seen from FIG. 3, the rising edge detection unit comprises an AND gate 320 that is connected to receive the termination signal, and a storage element 315 that is also connected to receive the termination signal. The storage element 315 may be a D flip-flop device. The AND gate 320 is further connected to receive an inverted output signal of the D flip-flop device 315. The output signal of the AND gate 320 is the above-mentioned control signal.

The interrupt message control logic of FIG. 3 further comprises an edge detection unit 220 that receives a "done" signal, i.e., a start indication signal that indicates that an edge triggered interrupt message has been started in response to a previous start signal. The circuits of the edge detection unit 220 may be divided into two sub-units 325 and 340 where sub-unit 325 may be built using the same library element(s) used for designing the interrupt termination detection unit 200. In other words, sub-unit 325 may be understood to be a rising edge detection unit as discussed above, where AND gate 335 and D flip-flop device 330 correspond to AND gate 320 and D flip-flop device 315, respectively. The output of the AND gate 335 is fed to the second sub-unit 340 of the edge detection unit 220.

Sub-unit 340 comprises a storage element 355 that may again be a D flip-flop device. The D flip-flop device 355 receives via OR gate 350 an output signal of the interrupt input unit 210. As may be understood, this signal indicates the occurrence of a level sensitive interrupt request.

There is provided another OR gate 345 that is connected to receive the output signal of the rising edge detection unit 325. OR gate 350 is connected to receive an inverted output signal of OR gate 345. A NOR gate may be used instead of OR gate 345. The gate 345 is connected to receive an inverted output signal of D flip-flop device 355.

Discussing now the operation of the interrupt message control logic of FIG. 3, a device 120 may indicate an active interrupt request by asserting the shared level sensitive interrupt line. The rising edge of this signal is then detected in the interrupt input unit 210, and the edge detection unit 220 sets active the interrupt message start signal so that an interrupt message may be generated in the interrupt message generator 230.

When this cycle is finished, i.e., when the interrupt message is generated and sent to the interrupt service routine 110, the interrupt message generator 230 issues a "done" signal, i.e., a start indication signal indicating that the interrupt message has been successfully started. This signal may be a pulse which is one clock cycle long.

The rising edge of the start indication signal is detected in sub-unit 325, and the circuitry of sub-unit 340 then resets the interrupt message start signal.

When the processor reports back that the interrupt routine 110 has terminated, e.g., by writing to the EOI register 130, a pulse on the "clear" line is generated, i.e., a termination signal is generated. The rising edge of this signal is detected in the interrupt termination detection unit 200 so that the interrupt input unit 210 may issue another request occurrence signal to the edge detection unit 210 in case the input interrupt request line is still asserted.

To give an example, if there was only one interrupt pending, the interrupt request signal was cleared by the device 120 before. But if there are more than one interrupts pending, the level sensitive interrupt request line is still asserted. The control signal from the interrupt termination detection unit 200 that indicates a rising edge of the termination signal may then force the interrupt input unit 210 to cause the edge detection unit 220 to once again generate an interrupt message start signal.

It has to be noted that the interrupt termination detection unit 200 and the edge detection unit 220 may be located in clock domains that are different from the clock domain of the interrupt input unit 210. In this case, the interrupt termination detection unit 200 and the edge detection unit 220 may comprise synchronization circuitry for translating between the clock domains. The synchronization circuitry may comprise two D flip-flop devices (not shown) which may be located in units 200 and 325, respectively, so that still the same library element(s) can be used when designing the circuits.

Figure 4:
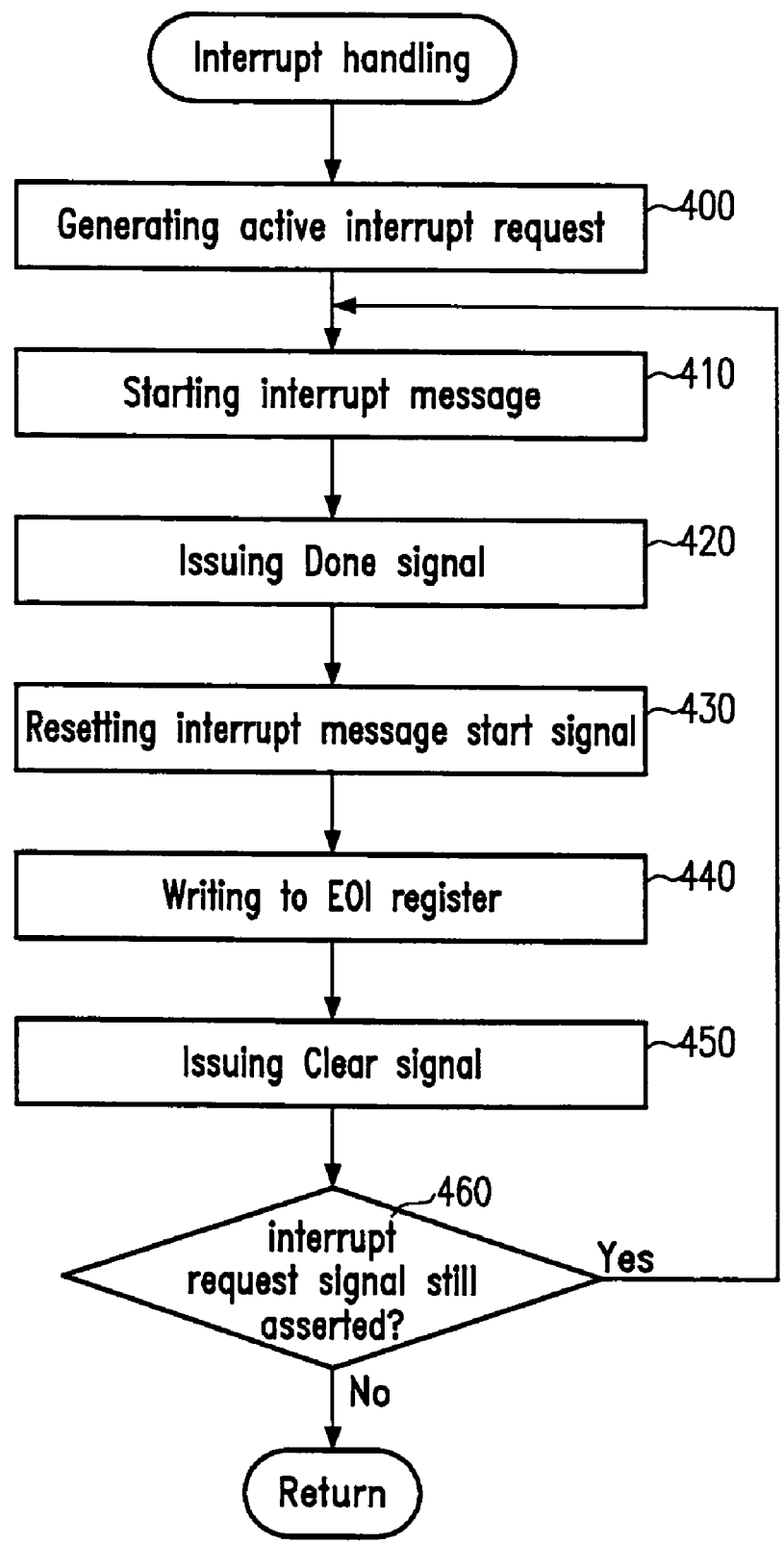
FIG. 4 is a flow chart illustrating the process of performing interrupt handling according to an embodiment.

Turning now to FIG. 4, a flow chart is provided for purposes of discussing the interrupt handling process according to an embodiment. In step 400, the device 120 generates a level sensitive interrupt request that is received by logic 210, i.e., by the interrupt input unit 210 of the interrupt message control logic 100.

The interrupt message control logic 100 then generates an interrupt message start signal in step 410 and starts an interrupt message. After having started the interrupt message, a start indication signal is generated in step 420 and provided to the edge detection unit 220. In response to the start indication signal, the interrupt message control logic 100 resets the interrupt message start signal in step 430.

Once the processor reports back that the interrupt routine has terminated, i.e., by writing to the EOI register 130 (step 440), a termination signal is generated in step 450 which is then received by the EOI detection unit 200, i.e., the interrupt termination detection unit 200 (step 450). If the interrupt request signal is determined in step 460 to be still asserted, the process returns back to step 410 to start another interrupt message.

As apparent from the foregoing, an interrupt handling technique is provided that may allow for sharing level sensitive interrupts in systems where interrupts are message based, i.e., edge triggered. The asserting edge of a shared level sensitive interrupt may be translated into an MSI message which is then sent to the processor. If it happens that a second shared interrupt source becomes active before the interrupt service routine clears the first interrupt, another edge can be detected although the input interrupts are level triggered. This allows for detecting any number of further interrupts as long as the level sensitive interrupt request line is still asserted.

In an embodiment, the interrupt message control logic 100 is embodied on an integrated circuit chip. Further, the interrupt message generator 230 may comprise a finite state machine.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. An interrupt handling apparatus for a system in which a plurality of interrupt sources share a level sensitive interupt, the interrupt handing apparatus comprising:

an interrupt input unit configured to receive level sensitive interrupt requests and generate request occurrence signals therefrom, each request occurrence signal indicating that a level sensitive interrupt request has been received;

an edge detection unit connected to said interrupt input unit and configured to receive said request occurrence signals and generate start signals for edge triggered interrupt messages on the basis of the received request occurrence signals; and an interrupt termination detection unit configured to receive termination signals each indicating that an interrupt routine relating to a previous edge triggered interrupt message has terminated, wherein, in response to receiving a termination signal relating to a first edge triggered interrupt message generated on the basis of a request occurrence signal associated with a first level sensitive interrupt request received from one of the plurality of interrupt sources, said interrupt termination detection unit is configured to control said interrupt input unit to output a request occurrence signal for generating a second edge triggered interrupt message if a second level sensitive interrupt request previously received from another one of the plurality of interrupt sources is still active.

2. The interrupt handling apparatus of claim 1 further comprising:

an interrupt message generator connected to said edge detection unit for receiving said start signals, said interrupt message generator adapted to generate edge triggered interrupt messages in response to said start signals.

3. The interrupt handling apparatus of claim 2, wherein said interrupt message generator is adapted to generate a start indication signal indicating that an edge triggered interrupt message has been generated, and output said start indication signal to said edge detection unit.

4. The interrupt handling apparatus of claim 2, wherein said interrupt message generator is adapted to apply an MSI (Message Signaled Interrupt) mechanism.

5. The interrupt handling apparatus of claim 2, wherein said interrupt message generator comprises a finite state machine.

6. The interrupt handling apparatus of claim 1, wherein said interrupt termination detection unit is an EOI (End Of Interrupt) detection unit, and said termination signals are EOI messages.

7. The interrupt handling apparatus of claim 1, wherein said interrupt termination detection unit is an EOI (End of Interrupt) detection unit, and said termination signals are signals indicating that an EOI register has been written to.

8. The interrupt handling apparatus of claim 1, wherein said interrupt input unit comprises an AND gate connected to receive said level sensitive interrupt requests, a storage element connected to receive said level sensitive interrupt requests, and an OR gate connected to receive an inverted output signal of said storage element and a control signal from said interrupt termination detection unit, said AND gate being connected to said OR gate to receive an output signal thereof.

9. The interrupt handling apparatus of claim 8, wherein said storage element is a D flip-flop device.

10. The interrupt handling apparatus of claim 8, wherein said control signal indicates a rising edge of a termination signal.

11. The interrupt handling apparatus of claim 1, wherein said interrupt termination detection unit comprises a rising edge detection unit connected to receive said termination signals and adapted to generate control signals to control said interrupt input unit.

12. The interrupt handling apparatus of claim 11, wherein said rising edge detection unit comprises an AND gate connected to receive said termination signals, and a storage element connected to receive said termination signals, said AND gate being connected to receive an inverted output signal of said storage element, said AND gate being further connected to said interrupt input unit to output said control signals thereto.

13. The interrupt handling apparatus of claim 12, wherein said storage element is a D flip-flop device.

14. The interrupt handling apparatus of claim 1, wherein said edge detection unit comprises a storage element connected to receive said request occurrence signals from said interrupt input unit, and adapted to output said start signals.

15. The interrupt handling apparatus of claim 14, wherein said storage element is a D flip-flop device.

16. The interrupt handling apparatus of claim 1, wherein said edge detection unit is connected to receive a start indication signal indicating that an edge triggered interrupt message has been started.

17. The interrupt handling apparatus of claim 16, wherein said edge detection unit comprises a rising edge detection unit connected to receive said start indication signal.

18. The interrupt handling apparatus of claim 17, wherein said rising edge detection unit comprises an AND gate connected to receive said start indication signal, and a first storage element connected to receive said start indication signal, said AND gate being connected to receive an inverted output signal of said first storage element.

19. The interrupt handling apparatus of claim 18, wherein said edge detection unit further comprises a first OR gate connected to receive said request occurrence signals, a second OR gate connected to receive an output signal of said AND gate, and a second storage element connected to receive an output signal of said first OR gate, said first OR gate being connected to receive an inverted output signal of said second OR gate, said second OR gate being connected to receive an inverted output signal of said second storage element.

20. The interrupt handling apparatus of claim 19, wherein said first and second storage elements are D flip-flop devices.

21. The interrupt handling apparatus of claim 1, wherein said interrupt input unit is connected to receive level sensitive interrupt requests from at least one peripheral device.

22. The interrupt handing apparatus of claim 1, wherein said interrupt input unit is connected to receive said level sensitive interrupt requests from at least one PCI (Peripheral Component Interconnect) device.

23. A method for handling interrupts in a system including a plurality of interrupt sources sharing a level sensitive interrupt, the interrupt handling method comprising:
receiving level sensitive interrupt requests from one or more of the plurality of interrupt sources;
generating request occurrence signals based on said level sensitive interrupt requests, each request occurrence signal indicating that a level sensitive interrupt request has been received;
generating start signals for edge triggered interrupt messages on the basis of said request occurrence signals;
receiving termination signals each indicating that an interrupt routine relating to a previous edge triggered interrupt message has terminated; and
in response to receiving a termination signal relating to a first edge triggered interrupt message generated on the basis of a request occurrence signal associated with a first level sensitive interrupt request received from one of the plurality of interrupt sources, outputting a request occurrence signal for generating a second edge triggered interrupt message if a second level sensitive interrupt request previously received from another one of the plurality of interrupt sources is still active.

24. The interrupt handling method of claim 23, further comprising:
generating edge triggered interrupt messages in response to said start signals.

25. The interrupt handling method of claim 24, further comprising:
generating a start indication signal indicating that an edge triggered interrupt message has been generated; and
resetting a previously generated start signal in response to a generated start indication signal.

26. The interrupt handling method of claim 24, adapted to apply an MSI (Message Signaled Interrupt) mechanism.

27. The interrupt handling method of claim 24, wherein generating the edge triggered interrupt messages comprises operating a finite state machine.

28. The interrupt handling method of claim 23, wherein said termination signals are EOI (End Of Interrupt) messages.

29. The interrupt handling method of claim 23, wherein said termination signals are signals indicating that an EOI (End of Interrupt) register has been written to.

30. The interrupt handling method of claim 23, wherein said steps of receiving level sensitive interrupt requests and generating request occurrence signals comprise:
   operating an AND gate to receive said level sensitive interrupt requests;
   operating a storage element to receive said level sensitive interrupt requests; and
   operating an OR gate to receive an inverted output signal of said storage element and a control signal that is generated in response to receiving a termination signal, wherein said AND gate is operated to receive an output signal of said OR gate.

31. The interrupt handling method of claim 30, wherein operating said storage element comprises operating a D flip-flop device.

32. The interrupt handling method of claim 30, wherein said control signal indicates a rising edge of a termination signal.

33. The interrupt handling method of claim 23, wherein receiving the termination signals comprises:
   detecting a rising edge of a termination signal and generating a control signal in response to a detected rising edge to control the generation of a request occurrence signal.

34. The interrupt handling method of claim 33, wherein detecting the rising edge comprises:
   operating an AND gate to receive said termination signals; and
   operating a storage element to receive said termination signals,
   wherein said AND gate is operated to receive an inverted output signal of said storage element and output said control signal.

35. The interrupt handling method of claim 34, wherein operating said storage element comprises operating a D flip-flop device.

36. The interrupt handling method of claim 23, wherein generating said start signals comprises:
   operating a storage element to receive said request occurrence signals and output said start signals.

37. The interrupt handling method of claim 36, wherein operating said storage element comprises operating a D flip-flop device.

38. The interrupt handling method of claim 23, further comprising:
   receiving a start indication signal indicating that an edge triggered interrupt message has been started.

39. The interrupt handling method of claim 38, further comprising:
   detecting a rising edge of said start indication signal.

40. The interrupt handling method of claim 39, wherein detecting a starting edge comprises:
   operating an AND gate to receive said start indication signal; and
   operating a first storage element to receive said start indication signal,
   wherein said AND gate is operated to receive an inverted output signal of said first storage element.

41. The interrupt handling method of claim 40, wherein generating the start signals further comprises:
   operating a first OR gate to receive said request occurrence signals;
   operating a second OR gate to receive an output of said AND gate; and
   operating a second storage element to receive an output signal of said first OR gate,
   wherein said first OR gate is operated to receive an inverted output signal of said second OR gate, and
   wherein said second OR gate is operated to receive an inverted output signal of said second storage element.

42. The interrupt handling method of claim 41, wherein operating said first and second storage elements comprises operating D flip-flop devices.

43. The interrupt handling method of claim 23, wherein said level sensitive interrupt requests are received from at least one peripheral device.

44. The interrupt handling method of claim 23, wherein said level sensitive interrupt requests are received from at least one PCI (Peripheral Component Interconnect) device.

45. An interrupt handling method comprising:
   receiving a level sensitive interrupt request;
   generating a first edge triggered interrupt message on the basis of said received level sensitive interrupt request;
   determining whether an interrupt routine relating to said first edge triggered interrupt message has terminated;
   when an interrupt routine relating to said first edge triggered interrupt message has terminated, determining whether said received level sensitive interrupt request is still active; and
   if it is determined that said received level sensitive interrupt request is still active, generating a second edge triggered interrupt message.

46. An integrated circuit chip including interrupt handling circuitry for a system in which a plurality of interrupt sources share a level sensitive interrupt, the interrupt handling circuitry comprising:
   an interrupt input circuit configured to receive level sensitive interrupt requests and generate request occurrence signals therefrom, each request occurrence signal indicating that a level sensitive interrupt request has been received;
   an edge detection circuit connected to said interrupt input circuit and configured to receive said request occurrence signals and generate start signals for edge triggered interrupt messages on the basis of the received request occurrence signals; and
   an interrupt termination detection circuit configured to receive interrupt termination signals each indicating that an interrupt routine relating to a previous edge triggered interrupt message has terminated,
   wherein said interrupt termination detection circuit is configured to control said interrupt input circuit to output a request occurrence signal in response to a received termination signal that indicates termination of an interrupt routine relating to an edge triggered message started based on a request occurrence signal generated in response to a level sensitive interrupt request received from one of the plurality of interrupt sources, if a level sensitive interrupt request previously received from another one of the plurality of interrupt sources is still active.

47. A computer system comprising:
   a processor coupled to a signaling bus configured to transport edge triggered interrupt messages;
   a plurality of devices configured to issue level sensitive interrupt requests via a shared level sensitive interrupt request line; and
   an interrupt message control logic configured to generate a first edge triggered interrupt message on the basis of a level sensitive interrupt request received from one of the plurality of devices, and wherein the interrupt message control logic is further configured to generate a second edge triggered interrupt message if said received level sensitive interrupt request is still active when an interrupt routine relating to said first edge triggered interrupt message has terminated.

48. The computer system of claim 47, wherein said interrupt message control logic comprises:
   an interrupt input unit configured to generate request occurrence signals in response to received level sensitive interrupt requests;
   an edge detection unit configured to generate start signals for edge triggered interrupt messages on the basis of said request occurrence signals; and
   an interrupt termination detection unit configured to receive termination signals each indicating that an interrupt routine relating to a previous edge triggered interrupt message has terminated,
   wherein, in response to receiving a termination signal relating to a first edge triggered interrupt message generated on the basis of a request occurrence signal associated with a first level sensitive interrupt request received from one of the plurality of interrupt sources, said interrupt termination detection unit is configured to control said interrupt input unit to output a request occurrence signal for generating a second edge triggered interrupt message if a second level sensitive interrupt request previously received from another one of the plurality of interrupt sources is still active.

* * * * *